W. H. FRENCH.
RAIL JOINT.
APPLICATION FILED JUNE 30, 1909.
952,324.
Patented Mar. 15, 1910.
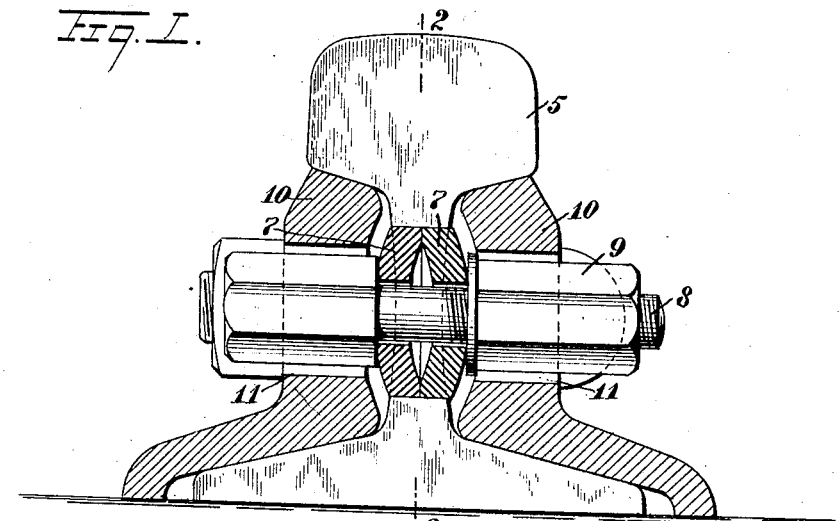
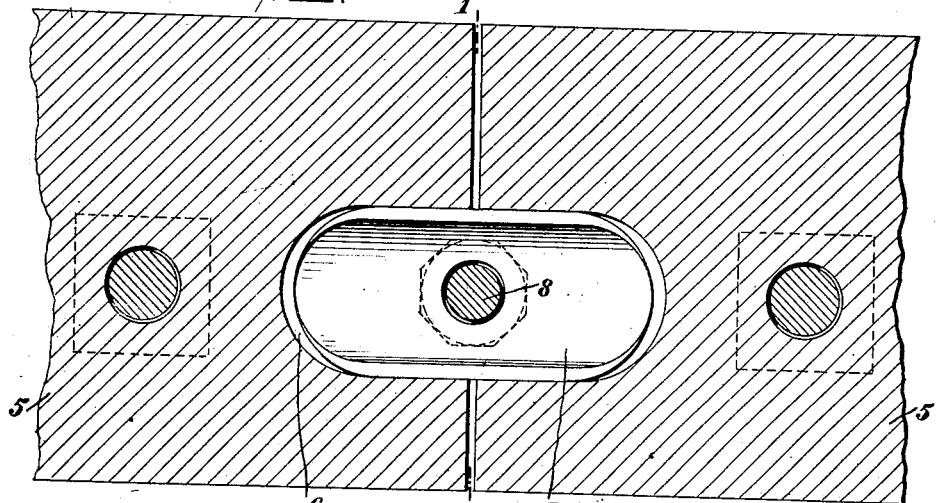
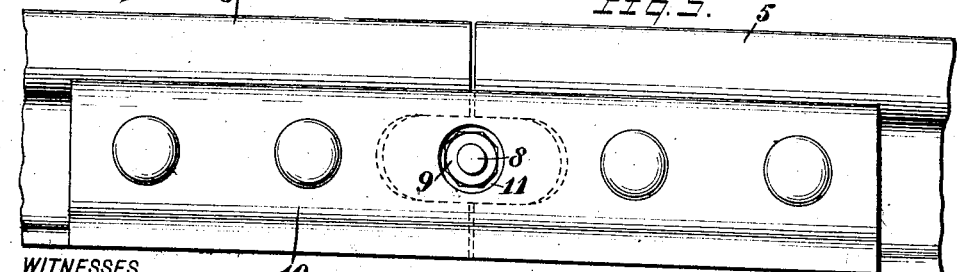
WITNESSES
H. J. Walker
INVENTOR
William Horace French
BY
ATTORNEYS

UNITED STATES PATENT OFFICE.

WILLIAM HORACE FRENCH, OF EVANSVILLE, INDIANA.

RAIL-JOINT.

952,324.  Specification of Letters Patent. Patented Mar. 15, 1910.

Application filed June 30, 1909. Serial No. 505,190.

*To all whom it may concern:*

Be it known that I, WILLIAM HORACE FRENCH, a citizen of the United States, and a resident of Evansville, in the county of Vanderburg and State of Indiana, have invented a new and Improved Rail-Joint, of which the following is a full, clear, and exact description.

The invention is an improvement in rail joints, and has in view a joint of such construction as will not be depressed or dipped under the weight of the rolling stock, whereby the jarring incident to the hammering of the wheels is substantially eliminated. In constructing such a joint I provide the adjacent ends of the rails with a common transverse opening or slot in which are placed two curved members or plates, with the concave faces of the plates facing inwardly, and means tending to flatten and expand the plates to bind against the upper and lower walls or edges of the opening.

Reference is to be had to the accompanying drawings forming a part of this specification, in which similar characters of reference indicate corresponding parts in all the views.

Figure 1 is a cross section on the line 1—1 in Fig. 2, through a rail joint embodying my invention; Fig. 2 is a longitudinal central section of the same, on the line 2—2 in Fig. 1; and Fig. 3 is a side view of the finished joint.

5, 5 indicate two rails arranged end to end and having a common transverse opening or slot 6 extending longitudinally in the webs. Within this slot are placed two curved spring-plates or members 7, having their concave faces inwardly turned and bearing on each other at the top and the bottom edges only. The width of the spring-plates is such as to neatly fit the opening and they are substantially less in length than the length of the opening, whereby when a pressure is applied to the outside of the plates, tending to flatten them out, they will bind against the top and bottom edges or walls of the slot, while the end walls or edges of the openings will be free, to permit of the expansion and contraction of the rail. For convenience of construction, the ends of the slot 6 are preferably rounded, and the ends of the plates are shaped to conform thereto. The combined thickness of the plates is substantially equal to the thickness of the webs of the rails, as shown in Fig. 1, and they are provided with alining central openings through which is passed a bolt 8 having a nut 9 on its threaded end. When the nut 9 is tightened, the plates are jammed together and tend to flatten out, thus effectually keying the two rails together and preventing relative vertical movement between them. Both the head of the bolt and nut are of sufficient length to extend to the outside of the usual fish-plates 10, where they may be engaged by a wrench. For this purpose the fish-plates are each provided with a central opening 11 sufficiently large for the head of the bolt or nut to turn in.

Having thus described my invention, I claim as new and desire to secure by Letters Patent:

1. The combination of two rails arranged end to end and having a common transverse opening extending through the webs, a curved locking device located within the opening, and means tending to straighten out the device to force it into engagement with the bottom and top walls of the opening and secure the rail ends against relative vertical movement.

2. The combination of two rails arranged end to end and having a common opening extending transversely through the webs, a dished member arranged in said opening, and means tending to flatten said member and bind the edges thereof against the top and bottom walls of the opening.

3. The combination of two railway rails arranged end to end and having a common opening through the webs, curved spring-plates arranged within said opening, with the concave faces of the plates in opposed position, and a bolt passing through the plates to expand them against the upper and lower walls of the opening.

4. The combination of two rails arranged end to end and having a common opening, spring-plates arranged within the opening and transversely curved, with the concave faces of the plates turned inwardly, and means to force the plates together and expand them against the top and bottom walls of the opening.

5. The combination of two rails arranged end to end and having a common longitudinal slot extending transversely through the webs, transversely curved spring plates arranged within the opening, with the concave faces of the plates facing each other, said plates being of a length substantially less than the length of the slot and of a normal width approximately equal to the width of the slot, and a bolt passing through the plates to bind them together.

6. The combination of two rails arranged end to end and having a common transverse opening extending through the web, plates transversely curved and arranged in said opening, a bolt passing through the plates having a nut threaded thereon to bind the plates together and expand them against the top and bottom walls of the opening, and fish plates arranged at opposite sides of the rail ends and having openings to respectively receive the head of the bolt and the nut.

In testimony whereof I have signed my name to this specification in the presence of two subscribing witnesses.

WILLIAM HORACE FRENCH.

Witnesses:
CHARLES S. KAHN,
PHELPS F. DARBY.